United States Patent [19]

Meyer

[11] 3,968,613
[45] July 13, 1976

[54] TRIM MOLDING ASSEMBLY
[75] Inventor: Engelbert A. Meyer, Union Lake, Mich.
[73] Assignee: USM Corporation, Boston, Mass.
[22] Filed: June 3, 1974
[21] Appl. No.: 475,839

[52] U.S. Cl. .................................. 52/400; 52/403; 52/717
[51] Int. Cl.² .................... E04F 19/02; E04B 1/62
[58] Field of Search ............ 52/717, 718, 403, 400; 24/73 BC, 73 FT, 73 MF, 73 P, 73 PM, 73 PP, 73 SM

[56] References Cited
UNITED STATES PATENTS

| | | | |
|---|---|---|---|
| 3,077,251 | 2/1963 | Fraylick et al. | 52/718 |
| 3,110,068 | 11/1963 | Perrochat | 52/718 |
| 3,634,991 | 1/1972 | Barton et al. | 52/718 |
| 3,720,030 | 3/1973 | Krodel | 52/717 |
| 3,738,074 | 6/1973 | Tucker | 52/718 |

Primary Examiner—Ernest R. Purser
Assistant Examiner—James L. Ridgill, Jr.
Attorney, Agent, or Firm—Burton, Parker & Schramm

[57] ABSTRACT

A molding assembly including a resilient pad affixed to a support, and a hollow molding device overlying the pad, with a fastener interconnecting the molding device to the pad, and wherein the resilient pad is provided with a longitudinal slit, and the fastener has a body portion interfitting within the molding and an integral tongue-like extension projecting into the slit in the pad, the slit being expanded by the entrance of the extension and both having cooperating surfaces extending laterally with respect to the plane of the slit for interlocking engagement with one another to retain the fastener to the pad.

4 Claims, 9 Drawing Figures

TRIM MOLDING ASSEMBLY

BACKGROUND OF THE INVENTION

The invention lies generally in the field of fastener assemblies, and more particularly to the securement of metal moldings to automobile bodies. More specifically, the instant fastener assembly is designed to secure a channel-shaped molding device along the lower marginal edge of a fixed window of an automobile, such as the backlight or rear window.

The lower marginal edge of the rear window opening on modern day automobiles is defined by a recessed flange extending around the window opening and forming a part of the window frame of the automobile body. Because of the slant of the rear window this flange forms a pocket in the window frame within which water and moisture may collect. When it rains, or when the automobile is washed, water runs down the back window and accumulates in this pocket, causing rust and corrosion. In order to alleviate this problem of water accumulation, prior workers in this art have provided a flexible, resilient strip or pad of rubber or the like extending along the bottom of the window opening and substantially filling the pocket. The rubber pad is adhesively secured to the metal automobile body, and the window glass rests on top of the pad. The inclusion of the rubber pad has precluded the use of conventional means for attaching the usual metal trim molding which may run part way if not completely around the perimeter of the rear window.

SUMMARY OF THE INVENTION

In order to secure such a molding strip in place, the present invention contemplates a fastener or clip, preferably a one-piece device formed of hardened plastic material, which has a body portion receivable within the metal molding and a tongue-like extension projecting away from the body portion. A feature of the invention is the provision of a narrow longitudinal slit in the resilient pad which is designed to receive and compressibly grip the fastener extension to secure the molding strip in place along the lower marginal edge of the rear window. Preferably, the walls of the slit in the rubber pad and the fastener extension have complementary abutable surfaces or shoulders which interengage with one another upon insertion of the extension into the slit to prevent withdrawal of the fastener and thus detachment of the molding. The weight of the window glass resting upon the top of the resilient pad also serves to exert a force tending to close the slit, and this compressive action assists in retention of the fastener extension therein.

Another feature of the invention relate to provisions for attaching the fasteners and molding strips to one another. In one form of the invention disclosed herein, the fasteners and molding strips are so designed that the fasteners are separately introduced into an open end of the molding and slid to selected positions along the molding where they are resistingly held in such positions. In this form of fastener securement the molding strip and its attached fasteners are installed as a unitary assembly on the supporting structure by forcible insertion of the fastener extensions into the slitted recess of the resilient pad. In another form of the invention disclosed herein, the fasteners and the molding strip are so constructed that the fasteners are first introduced into the slit of the pad at spaced intervals therealong and then thereafter the molding strip is snap fittingly engaged with the exposed parts of the inserted fasteners. Consequently, users of the invention are provided with a choice of two methods for mounting the molding assemblies.

BRIEF DESCRIPTION OF THE DRAWINGS

Various other objects, advantages and meritorious features of the invention will become more fully apparent from the following specification, appended claims and accompanying drawing sheets wherein:

DESCRIPTION OF PREFERRED EMBODIMENTS

Figure 1:
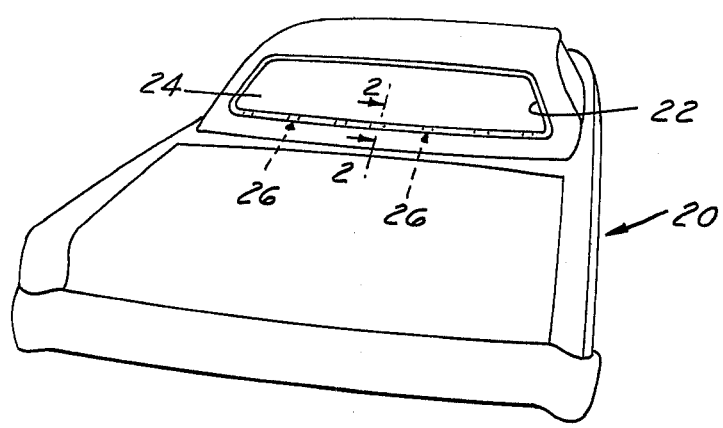
FIG. 1 is a rear perspective view of an automobile showing the rear window thereof along the lower marginal edge of which assemblies embodying the invention are used.

Referring first to FIG. 1, there is shown the rear end of an automobile 20 provided with a rear window opening 22 within which there is positioned a sheet of glass or other transparent member 24. Extending around the periphery of the glass sheet 24 is a metal molding 26 of channel-shaped cross-section which overlies the marginal edge of the glass.

Figure 2:
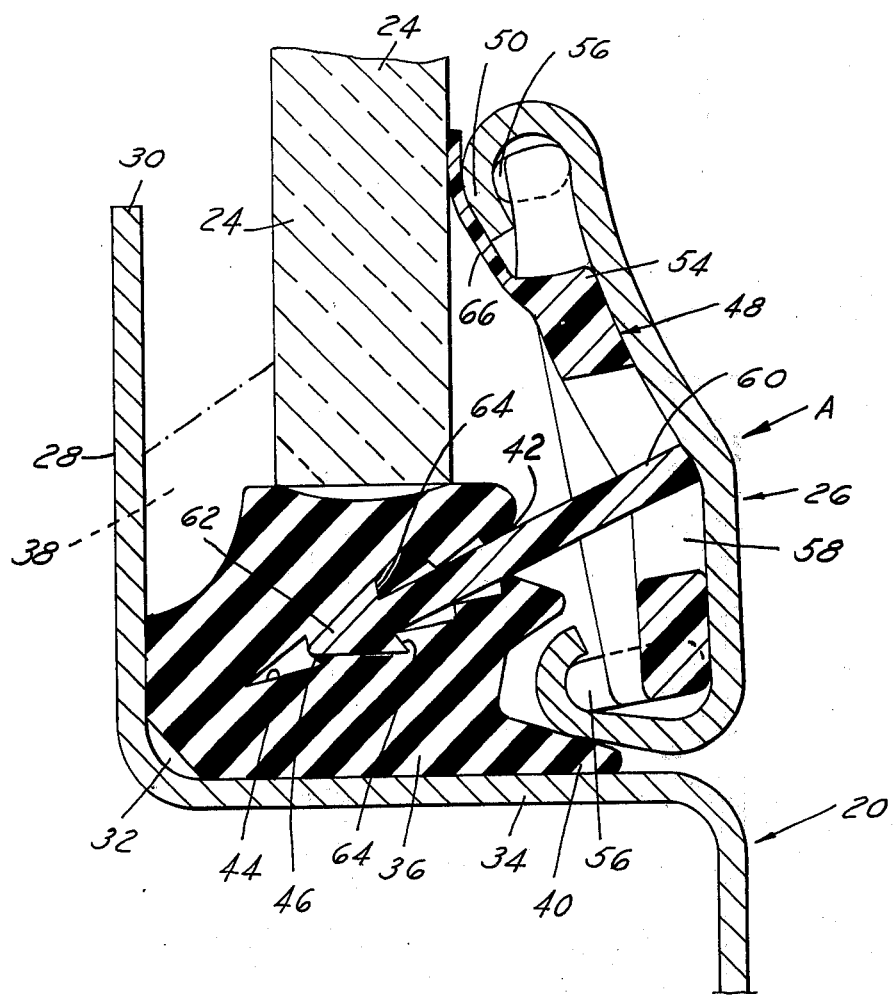
FIG. 2 is an enlarged cross-sectional view taken on line 2—2 of FIG. 1 showing a molding assembly embodiment of the invention.

Turning now to FIG. 2, there is an enlarged cross section view of the lower edge portion of the rear window of an automobile body 20 which terminates in a recessly positioned, generally upwardly extending sheet metal flange 28, the marginal edge 30 of which defines the lower limit of the sight area of the rear window opening. While sheet metal flange 28 and glass panel 24 have been shown extending vertically in FIG. 2 for convenience of illustration, in actuality the rear window 24 of the conventional automobile, and hence the flange 28 which extends generally parallel thereto, would slant at an appreciable angle from the vertical, and water running down the glass 24 would tend to accumulate in the corner 32 between the flange 28 and the sheet metal bottom portion 34 of the window opening. As there is no convenient way of providing for the run-off of the water from the corner 32, en elongate resilient pad or strip 36, made out of natural or synthetic rubber or the like, is positioned against the sheet metal portions 28 and 34, and is secured thereto, preferably by a suitable waterproof adhesive.

Once the resilient pad 36 is adhesively secured in place as shown in FIG. 2, the window glass 24 is positioned within the window opening in the usual fashion, i.e. a bead of material such as thiocol or the like shown in phantom at 38 is applied to the inwardly facing perimeter of the glass 24, and the glass is positioned resting on top of the pad 36. The pad 36 preferably has an outwardly projecting longitudinally extending flange or foot portion 40 upon which the metal molding 26 rests when in its assembled position.

The resilient pad 36 is preferably made out of a relatively soft rubber or vinyl material having a hardness of approximately 80-90 durometer. Opening through the outwardly facing surface of the pad 36 is a slit 42, which preferably extends for approximately the full length of the pad 36 and at an acute angle to the plane of the window glass 24, as shown in FIG. 2. The lips forming the mouth or entrance to the slit may be outwardly flared to facilitate entry of fastening implements to be described. One or both of the opposite side walls of the slit 42 are preferably shaped to form a series of arrowhead-like cavities 44 arranged in connected end-to-end relation, and defining laterally extending abutment surfaces or shoulders 46 facing inwardly of the slit. As can be seen from FIG. 2, the weight of the window glass 24 resting upon the pad 36 tends to close the slit 42, which increases the holding force of the pad on each fastener to be described.

Disposed within the hollow or channel-shaped metal molding 26 are a plurality of fasteners longitudinally spaced apart therealong, one of which is generally indicated at 48 in FIGS. 2 to 5. The molding 26 is preferably formed with inwardly curled opposite marginal edges such as shown at 50 for the top edge and at 52 for the bottom edge, and the fastener 48 is grippingly retained within the molding by engagement with the curled portions 50 and 52 as later described herein.

Figure 4:
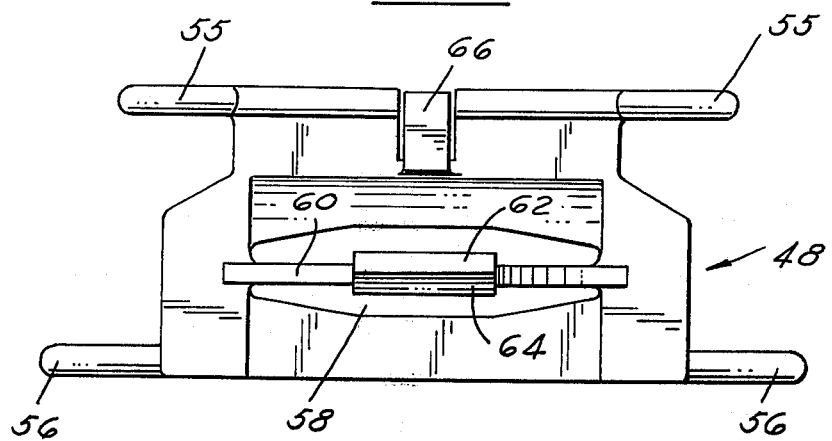
FIG. 4 is a side elevation of the fastener shown in FIG. 3.

Although each fastener 48 may be made of metal, it is preferred that the fastener be made of a suitable molded plastic material, such as Celcon or Delrin, and is of one piece and generally rectangular in shape as shown clearly in FIG. 4. The fastener 48 includes a body portion 54 receivable within the channel formation of the metal molding 26, and having a similar pair of top and bottom finger-like extensions or pins 55—55 and 56—56 projecting horizontally from each of its four corners, the fingers extending at a slight inclination to the plane of its body portion 54 in the manner illustrated in FIG. 5. The fastener body also is provided with a central opening or cutout 58 elongated longitudinally of the body 54 and terminating spaced from the opposite ends thereof as best shown in FIG. 4.

Projecting from the body 54 and extending substantially centrally of cutout 58, is an integrally connected extension 60 in the form of a web or tongue projecting generally perpendicularly from the body portion of the fastener and of generally trapezoidal shape. The tongue-shaped extension terminates in a pointed end section 62 of barb or wedge-shape configuration for cooperating engagement with the arrowhead cavities 44 of the slit 42 in the pad 36. The end section 62 is provided with lateral, opposite extending abutment surfaces 64 which interlock with the abutment surfaces 46 of the pad 36 following insertion of the fastener extension into the slit 42 thereby securing the molding strip to the pad in overlapping relation to the bottom edge portion of the glass pane. The extension 60, by virtue of its being connected only to the body 54 at the opposite ends of its trapezoidal base, is deflectable out of its normal plane to accomodate any inclination of the slit with respect thereto and to facitate proper positioning of the metal molding 26 with respect to the window glass 24 at the time of the assembly of these parts.

Figure 5:
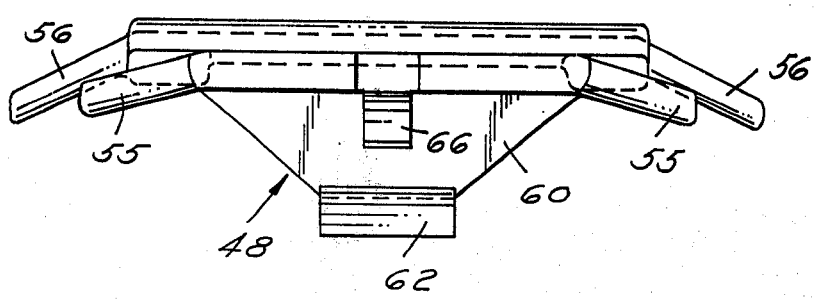
FIG. 5 is a top view of the fastener shown in FIGS. 3 and 4.
Figure 3:
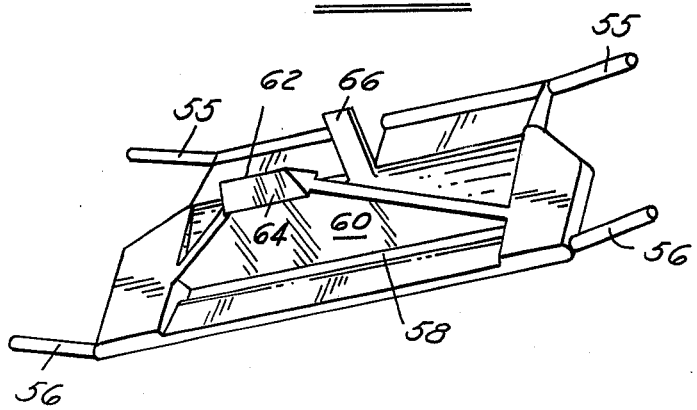
FIG. 3 is a perspective view of the fastener employed in the molding assembly of FIG. 2.

As previously mentioned in connection with FIG. 5, the fingers or pins 55—55 and 56—56 extend at a slight inclination to the plane of the fastener base or body portion 54, and are sufficiently resilient to be deflectable upon insertion of the fastener 48 into the molding 26. Thus, as can be observed from FIG. 2, the body 54 of the fastener is frictionally held against movement within the molding 26 by the pressing engagement of the fingers 56 against the opposite internal surfaces of the curled over edges 50 and 52 of the molding. Each fastener 48 is additionally provided with a flexible tab or fin 66 extending at an acute angle to the body portion 54, which upon assembly of the fastener within the molding 26, is interposed between the upper marginal edge 50 of the molding and the window glass 24. This insures against scratching of the glass and eliminates any objectionable noise which might otherwise occur upon vibration of the metal molding 26 against the glass 24.

As previously described herein, the pad 36 is first adhesively secured to the right-angled automobile body portions 28 and 34, effectively sealing against the entry of water or moisture into the corner 32. The window glass 24 is thereafter set into the opening defined by the recessed flange 28 of the automobile body sheet metal, the bottom edge of the glass 24 resting upon the resilient pad 36. A plurality of fasteners 48 are engaged within the metal trim molding 26 by being slid longitudinally therealong through an open end of the molding, with the tab 66 overlying the upper marginal edge 50 and the fingers 55—55 and 56—56 serving to frictionally retain each fastener in selected position in the molding.

The trim molding 26 is thereafter placed in position, with the fasteners therein, along the lower marginal edge of the window glass 24, and the edge of the wedge 62 of each fastener aligned with the entrance to the slit 42 in the pad 36. Complete assembly is then effected by urging the molding and fastener assembly in a direction generally toward the corner 32 of the window frame as shown in FIG. 2, as by a sharp but cushioned blow against the outer surface of the molding at the place and in the direction indicated by the arrow A in FIG. 2. The arrangement of the arrow-shaped portions 44 of the slit 42 provides a spaced series of abutable surfaces 46 against any one of which the complementary surfaces 64 of the fastener are engageable, and thus the molding will be properly positioned with respect to the window glass 24, even with some appreciable variation in the positioning or the dimensions of the glass 24 or in the location or inclination of the extension 60 with respect to the slit 42. Obviously, when setting the window glass 24 into the automobile body opening, the exact position of the glass may vary appreciably. With the construction shown, the window glass variation will not have an adverse effect on the positioning of the molding 26 because the lateral position of the molding with respect to the pad 36 may vary considerably.

Figure 6:
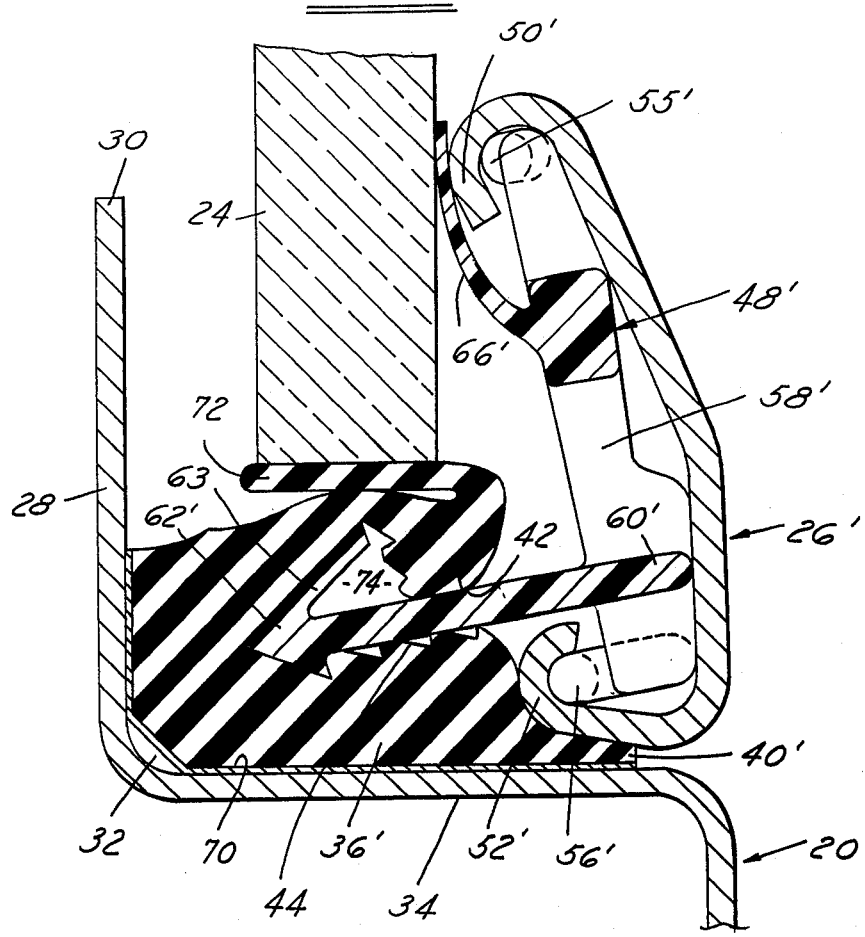
FIG. 6 is an enlarged cross-sectioned view similar to FIG. 2 but showing a modification of the invention.
Figure 7:
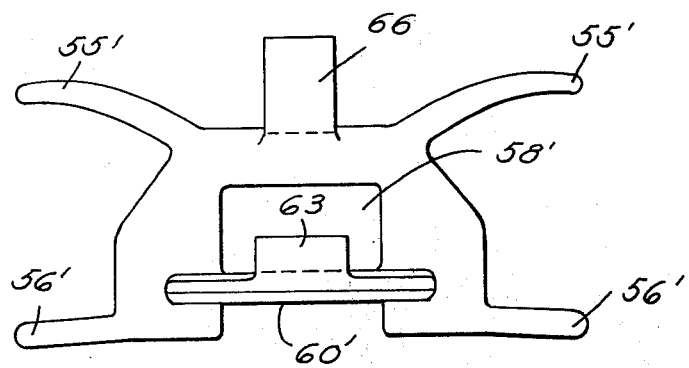
FIG. 7 is a side elevation of the fastener element employed in the molding assembly of FIG. 6.

The remaining Figures on the drawing sheets illustrate two modifications of the previous described embodiment of the invention. Common elements of the several forms of the invention illustrated therein either bear the same reference number where no change in the element has occurred or bear distinguishing prime numbers where similarly functioning elements are modified. FIGS. 6 and 7 illustrate one modification and their views correspond generally to FIGS. 2 and 4 respectively of the first illustrated embodiment. Similarly, FIGS. 8 and 9 illustrate another modified form of the invention and correspond generally to the views of FIGS. 6 and 7 and FIGS. 2 and 4 respectively.

Referring to FIGS. 6 and 7, the windowpane 24 and the right-angled portions 28 and 34 forming the window frame are identical to the first described embodiment of the invention. The pad of resilient material 36' is secured to the right-angled sections of the window frame by an adhesive layer 70. The upper portion of the resilient pad carries a hinged element or flap 72 integrally joined along one margin to the body of the pad. The flap extends the length of the window opening and provides a greater surface contact with the lower edge of the windowpane as compared with the type of windowpane support provided by the pad illustrated in FIG. 2. The tongue-shaped extension 60' of the modified fastener is generally like its counterpart in FIG. 2 except that the wedge-shaped section 62' of the former is provided with a wedging surface 63 on the upper side thereof which is approximately twice that of its lower side and as well as being approximately twice that of the upper and lower wedging surfaces of the extension 60 disclosed in the embodiment of FIG. 2. The additional surface area provided by the wedging surface 63 acts internally of the resilient pad 36' to expand its occupied space with the result the top section of the pad is bulged upwardly against the bottom edge of the glass pane 24 thereby raising the pane in the window opening if it is not already fully seated in the side and upper sections of the window frame. Additionally, the increased forces imposed to expand the resilient pad in this manner also act in the opposite direction to force the tongue-shaped extension 60' downwardly thereby to more forcibly interengage the locking shoulders on the extension 60' and lower side wall of the slit 42 to secure the fastener and trim molding to the resilient pad 36'. The distortion produced by the larger wedge portion 63 creates a small cavity 74 in the immediate region of the resilient pad 36', but the greater distortion of the pad 36' in this region compensates for the presence of the cavity by also strengthening the seal formed between the pad and extension 60' to prevent any ingress of moisture into the cavity.

A brief reference to FIG. 7 will show that the modified fastener 48' for the molding strip 26' has a general rectangular shape like the embodiment of FIG. 4 and also has two sets of upper and lower fingers 55'—55' and 56'56' and a central opening or cutout 58'. The cutout 58', however, opens out through the bottom of the fastener instead of being completely surrounded by material of which the fastener is formed as in the first embodiment of the invention. It is also to be noted that the extension 60' of FIGS. 6 and 7 is connected as in the previously described embodiment at only the side edges of its base end to the body of the fastener in order that it may be bent or deflected out of its normal plane if such should occur as the extension is inserted into the slit 42.

Figure 8:
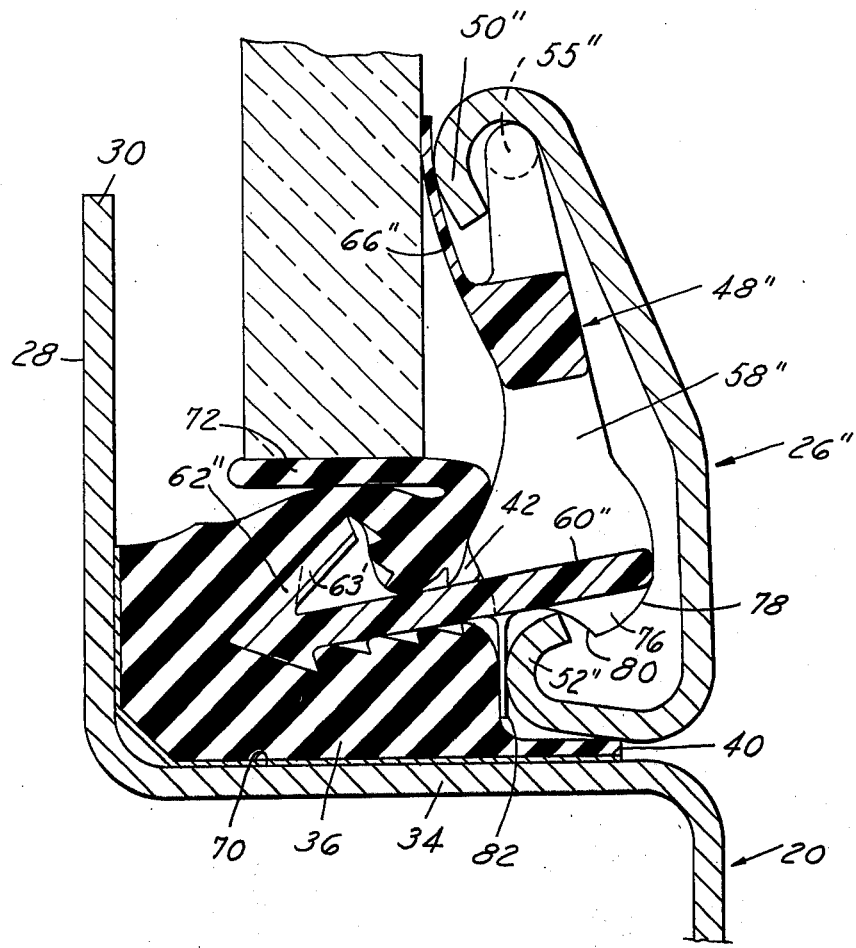
FIG. 8 is an enlarged cross-sectional view similar to FIG. 6 but showing a further modification of the invention.
Figure 9:
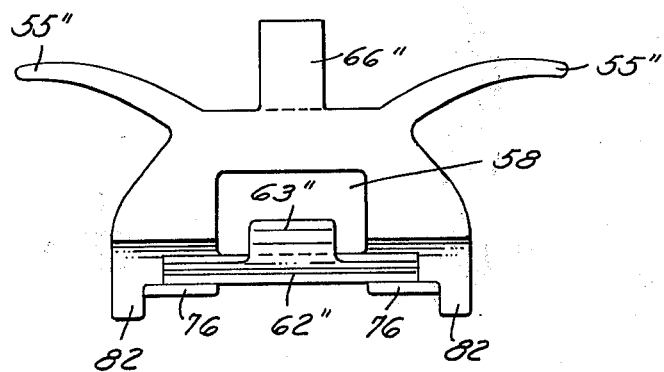
FIG. 9 is a side elevation of the fastener element employed in the molding assembly of FIG. 8.

The modification of the invention illustrated in FIGS. 8 and 9 is quite similar to that shown in FIGS. 6 and 7 but differs in the following manner: If FIG. 9 is compared with FIG. 7, it will be noted that only the upper set of fingers or pins 55''—55'' is used in the modification under consideration. In lieu of the missing lower set of fingers, the two areas of the fastener body where the base of the tongue extension 60'' is secured are each provided with a dependent protrusion or tang 76 of general triangular configuration as viewed in FIG. 8. It is to be further noted in FIG. 8, that one side 78 of each tang is slightly convexly curved and the other side 80 is slightly concavely curved. In assembled position, the lower curled margin 52'' of the molding 26'' has been slightly changed so to be hooked over the two tangs 76—76 as shown in FIG. 8.

Instead of introducing each fastener into an opened end of the molding strip 26'' and then sliding it to a selected position as performed in connection with the previously described embodiments of the invention, the provision of the slightly curved tangs 76—76 on the modified fastener of FIGS. 8 and 9 enables the molding strip 26'' to be snap fittingly mounted in proper position on the pad 36. This is accomplished by individually and visibly pressing each fastener 26'' into the slit 42 at spaced intervals therealong, following which the molding strip 26'' is then snap-fittingly applied over the exposed body portions of the resulting row of fasteners. Depending from each fastener body are two integrally connected, thin, flat-sided flanges or shields 82—82 of the character shown in FIGS. 8 and 9 which serve to limit the extent that their respective fasteners can be forced into the slit 42. When the molding strip 26'' is snap-fittingly secured to the already positioned fasteners, the upper curled margin 50'' of the molding is first fitted about the fingers 55''—55'' of the row of fasteners, following which the suspended molding strip is swung inwardly with the result that the lower curled margin 52'' of the molding strip is yieldingly pressed around the slightly convexly curved sides 78 of the tangs 76' of the row of fasteners and then into snap fitting engagement with concave sides 80 of the tangs to assume the position illustrated in full line in FIG. 8. To facilitate such an assembly operation the upper set of pins or fingers 55''—55'' of each fastener lie in the same plane as the bodies of the fasteners instead of being inclined thereto as in the previously described embodiments of the invention. By such a construction the fingers 55''—55'' of the fasteners inserted into the slit 42 are substantially in alignment with one another thereby to form a series of spaced apart hinge pintles upon which the upper curled margins 50'' of the molding strip may be suspended for the swinging movement.

It is believed to be evident from the preceding description that in the use of the invention below an automobile windowpane, the resilient pad not only serves as a support and spacer but one which is expandable by the insertion of the several forms of the fastener extensions 60, 60' and 60'' illustrated herein. The forced insertion of these extensions will cause the vertical height of the resilient pad to be increased to accomodate any variations in the vertical dimensions of the windowpanes as well as to force them into a fully seated condition in the window frames and at the same time cause the walls of the slit to apply contractual gripping pressures on the fastener extensions to retain the same and the molding in attached relation to the resilient pad. It is further evident this retention is strongly accentuated by the presence of interlocking complementary shoulders provided on one or both of the opposing walls of the slit and on one or both surfaces of the inserted fastener extensions.

While particular embodiments of the invention have been described and illustrated, it will be understood, of course, that it is not desired that the invention be limited thereto since additional modifications may be made. It is, therefore, contemplated by the appended claims to cover any such modifications as fall within the true spirit and scope of the invention.

What is claimed is:

1. A trim molding assembly comprising a support having a window frame opening therein, a pane of glass or the like positioned to substantially cover said opening, an elongated trim molding extending generally along the lower marginal edge of said pane, a resilient pad interposed between the lower side of said window frame and said lower marginal edge of the pane, and a fastener interconnecting the molding and the pad;

said fastener including a body portion joined to the trim molding, and having a tongue-shaped extension projecting generally perpendicularly away from the molding;

said resilient pad having a slit opening through the face thereof adjacent to said trim molding, but terminating short of the opposite face of the pad, said slit having the opposite walls thereof spaced apart normally less than the thickness of said fastener extension but being expanded apart by the forced insertion of the extension therein;

said fastener extension being engaged within said slit, with the fastener extension and the slit having complementary, transversely extending surface portions interengaged with one another following insertion of the extension into the slit to prevent withdrawal of the fastener from the pad;

said pane resting upon said pad, and said slit extending into said pad in a direction generally transverse to the plane of said pane, whereby at least a part of the weight of the pane acts on the pad in the direction to close said slit and cause the opposing walls of the slit to apply contractual gripping pressures on the fastener extension to retain the same within the slit;

the upper marginal edge of said trim molding overlying said pane, and said fastener including a fin projecting from the body portion of the fastener and interposed between said pane and the upper marginal edge of said molding;

said resilient pad having an outwardly projecting foot-like portion underlying the lower marginal edge of said molding and interposed between the molding and the lower side of the window frame;

said trim molding being generally channel-shaped in cross-section and extending for approximately the lateral extent of the pane, and said resilient pad being fixed to said support in underlying supporting relation to the lower marginal edge of the glass pane and extending for approximately the lateral extent of the pane.

2. A trim molding assembly as defined in claim 1 wherein the resilient pad is provided with a flap of the same resilient material as the pad and integrally joined along one of its margins to the upper portion of the pad so that it overlies the upper surface of the pad and bears against the exposed edge of the glass pane, said flap extending for the length of the exposed edge of the glass pane and providing substantial surface contact between the pad and the glass pane.

3. A trim molding assembly covering the space between a window frame of a vehicle and a window pane comprising, in combination;

a vehicle window frame, a window pane seated within the window frame and having an exposed edge extending in spaced generally parallel relationship to the bottom side of the window frame, a pad of resilient material extending along the frame member for the length of the exposed edge of the window pane, a molding strip, and a fastener interconnecting the molding strip and the resilient pad so that the molding strip overlappingly covers the space between the window pane and the bottom side of the window frame;

said resilient pad having a longitudinal slit therein extending parallel to the exposed edge of the window pane and opening through the side of the pad adjacent to said molding strip, said slit having a depth such as to intersect the plane of the window pane but terminates short of the opposite side of the pad and therefore divides the resilient pad into two sections which are integrally joined together beyond the termination of the slit;

said fastener having a first part thereof interfitting within the molding strip and connected thereto, and a second part in the form of a tongue-shaped extension of greater thickness than said slit and projecting away from said first part in a direction generally perpendicularly to the plane of the molding strip, said extension carrying a wedge-shaped portion adjacent to its inserted end which provides a surface inclined in the direction upwardly and outwardly relative to the slit;

said slit being expanded internally of the pad by the forced insertion thereinto of the tongue-shaped extension and the inclined surface of the wedge-shaped portion carried thereby so that the section of the pad nearer to the exposed edge of the window pane is urged into compressive engagement therewith and so that the section of the pad nearer to the bottom side of the window frame is pressed thereagainst with the result that the tongue-shaped extension of the fastener is resiliently contractually gripped by the opposing walls of the slit to firmly hold the molding strip to the pad and the top of the resilient pad is pressed upwardly against the exposed edge of the window pane to compensate for any irregularities in the dimensions or the seating of the window pane within the window frame.

4. A trim molding assembly comprising a support having a window frame opening therein, a pane of glass or the like positioned to substantially cover said opening, an elongated trim molding extending generally along the lower marginal edge of said pane, a resilient pad interposed between the lower side of said window frame and said lower marginal edge of the pane, and a fastener interconnecting the molding and the pad;

said fastener including a body portion joined to the trim molding, and having a tongue-shaped extension projecting generally perpendicularly away from the molding;

said resilient pad having a slit opening through the face thereof adjacent to said trim molding, but terminating short of the opposite face of the pad, said slit having the opposing walls thereof spaced apart normally less than the thickness of said fastener extension but being expanded by the forced insertion of the extension therein;

said fastener extension being engaged within said slit, with the fastener extension and the slit having complementary, transversely extending surface portions interengaged with one another following insertion of the extension into the slit to prevent withdrawal of the fastener from the pad, said fastener extension further having an inclined surface on the upper side thereof which slants at an acute angle upwardly and outwardly relative to the slit and sufficiently to produce an internal cavity within the pad and a consequent upwardly directed pressure by the pad against the lower marginal edge of the pane;

said pane resting upon said pad, and said slit extending into said pad sufficiently to underlie the pane and in a direction generally transverse to the plane of said pane, whereby at least a part of the weight of the pane acts on the pad in the direction to close said slit and cause the opposing walls of the slit to apply contractual gripping pressures on the fastener extension to retain the same within the slit;

said resilient pad being provided with a flap of the same resilient material as the pad and integrally joined along one of its margins to the upper portion of the pad so that it overlies the upper surface of the pad and bears against the lower marginal edge of the pane, said flap extending for the length of the lower edge of the pane and providing substantial surface contact between the pad and the pane; and said trim molding being generally channel-shaped in cross-section and extending for approximately the lateral extent of the pane, and said resilient pad being fixed to said support in underlying supporting relation to the lower marginal edge of the glass pane and extending for approximately the lateral extent of the pane.

* * * * *